United States Patent [19]

Kratky et al.

[11] Patent Number: 4,736,694

[45] Date of Patent: Apr. 12, 1988

[54] CONTAINERIZED PLANTER

[76] Inventors: Bernard A. Kratky, 461 W. Lanikaula; Ray Fornof, 20 Pookla, both of Hilo, Hi. 96720

[21] Appl. No.: 924,328

[22] Filed: Oct. 29, 1986

[51] Int. Cl.⁴ .............................................. A01C 11/00
[52] U.S. Cl. ................................... 111/4; 111/92; 111/94; 294/51
[58] Field of Search .................. 111/92, 94, 89, 93, 111/98, 99, 4; 172/21, 25, 126, 321; 7/114, 116, 166, 170, 104; 294/51; 135/78, 80, 77, 66, DIG. 9

[56] References Cited

U.S. PATENT DOCUMENTS

| | | | |
|---|---|---|---|
| 18,148 | 9/1857 | Hughes | 111/92 |
| 18,846 | 12/1857 | Hassler | 111/92 |
| 191,364 | 5/1877 | Nolan et al. | 111/4 |
| 592,489 | 10/1897 | Fair | 111/92 |
| 827,884 | 8/1906 | Ritter | 111/99 |
| 2,234,778 | 3/1941 | Redwood | 111/89 |
| 2,415,900 | 2/1947 | Myles | 111/92 X |
| 3,524,456 | 8/1970 | Dixon | 135/77 |

FOREIGN PATENT DOCUMENTS

| | | | |
|---|---|---|---|
| 65129 | 11/1946 | Denmark | 111/94 |
| 497842 | 4/1930 | Fed. Rep. of Germany | 111/89 |
| 814676 | 7/1949 | Fed. Rep. of Germany | 111/99 |

*Primary Examiner*—Robert E. Bagwill
*Assistant Examiner*—Danton D. DeMille

[57] ABSTRACT

A simple, one person transplanter in use from a standing position having a rectangular, tubular frame, the distance equivalent to the distance required between plants, and a dibble on one end to make the hole for the container which also spaces the plants the proper distance and having a hollow delivery chute for the containerized plants and a pair of opposed trowels for closing the soil around the container and also a platform secured to the upper end to support flats whereby the person doing the transplating is in a standing position at all times.

6 Claims, 1 Drawing Sheet

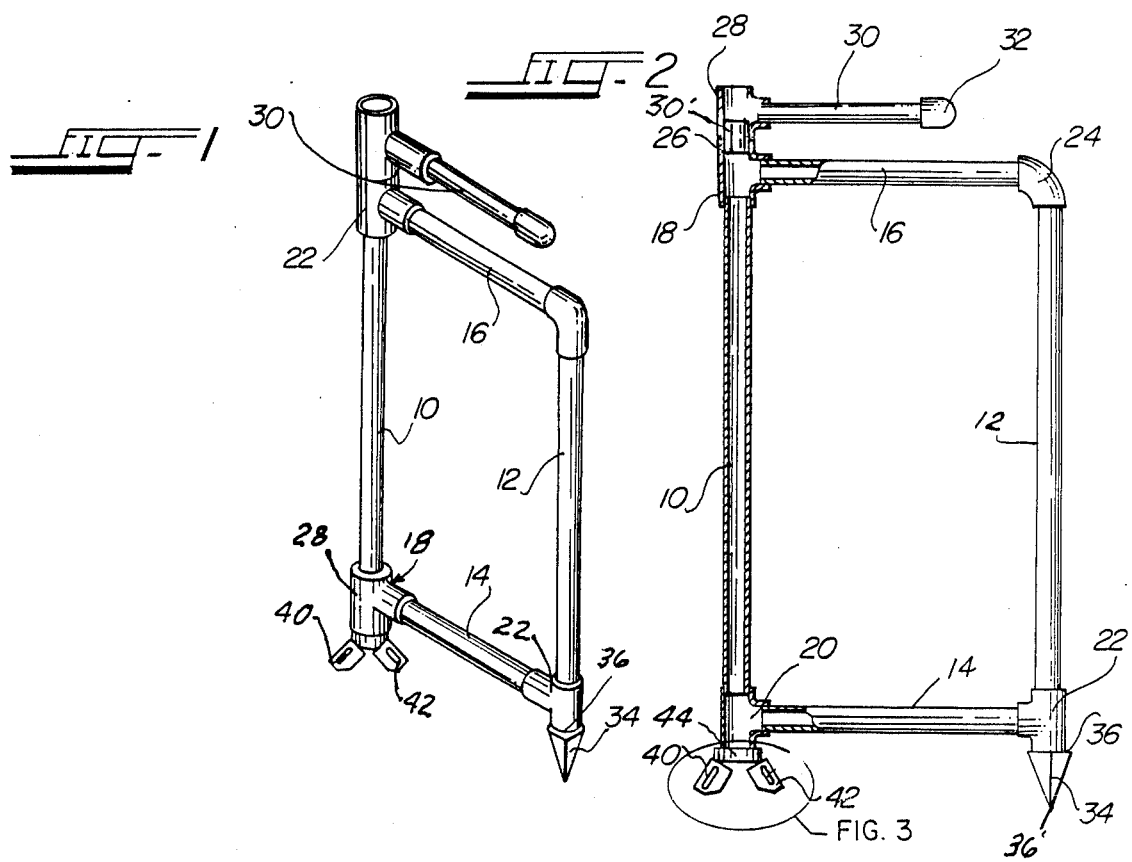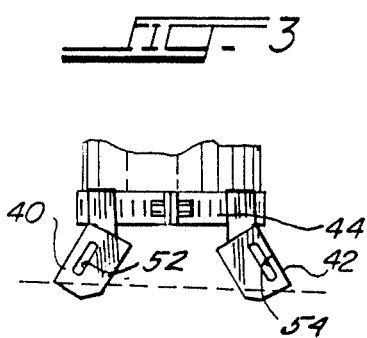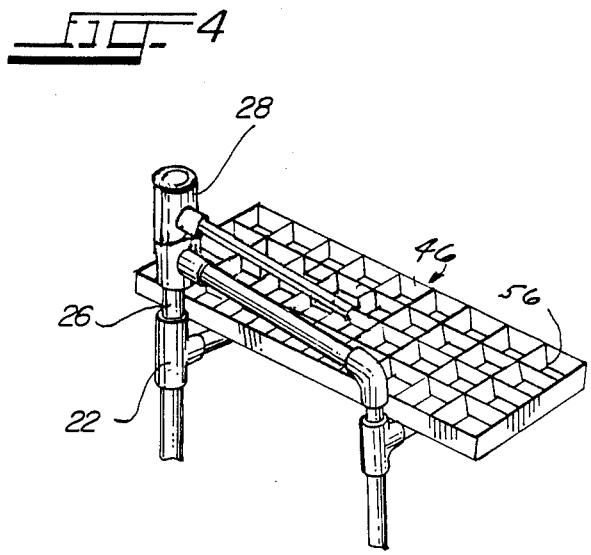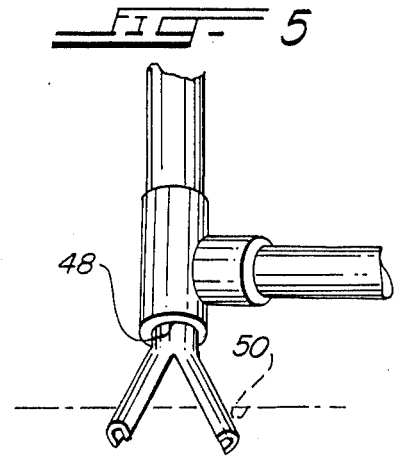

CONTAINERIZED PLANTER

BACKGROUND OF THE INVENTION

A preliminary search has been made and the following patents uncovered in Class 111, Subs. 4, 72, 89 and 94:

| | | |
|---|---|---|
| 382,069 | 1,563,625 | 4,218,981 |
| 557,483 | 2,865,315 | 4,267,782 |
| 1,238,576 | 3,249,034 | |
| 1,439,601 | 3,797,412 | |

None of the foregoing patents disclose the details of the present invention; for instance U.S. Pat. Nos. 382,069 and 557,483 are merely posthole diggers with no means to close the hole dug thereby.

U.S. Pat. No. 1,238,576 shows a dibble and an attached conical-shaped trough to place the soil around the plant and then force the trough adjacent the original hole to "throw the dirt around the roots within the hole", this requiring careful aim.

U.S. Pat. No. 1,439,601 is a marking device to locate the next planting hole. It appears to actually make a hole for seeds. The marking device is adjustable.

U.S. Pat. No. 1,563,625 is a spring-loaded dibble so that the dibble is raised and then a seedling is dropped in alignment to the dibble. It has a single spring-loaded pressure device to press the earth into one side of the hole but not completely around the seedling.

U.S. Pat. No. 2,865,315 has a semi-circular, pointed end steel bill having a pivotal member lying against the bill which is moved outwardly to allow the garlic, onion flower or bulb to reach the bottom of the hole dug by the bill. No means are provided to completely cover the hole.

U.S. Pat. No. 3,797,412 has a pair of jaws like U.S. Pat. No. 2,865,315 wherein one jaw is movable outwardly. It does not disclose any means for closing the hole.

U.S. Pat No. 4,218,981 is similar to U.S. Pat. No. 1,563,625 except it has no dibble and no springs but has a marker for the next seed and has no means to cover the hole made by the dibble.

U.S. Pat. No. 4,267,792 is a watering device to make a hole in the ground, and that is all.

SUMMARY OF THE INVENTION

A simple, hand-held while standing upright, lightweight, rectangular, tubular frame construction having a handle suspended above the rectangular frame and parallel to the upper horizontal member, a dibble on one of the ends of one of the vertical uprights and a pair of opposed trowels on the other vertical upright to cover the containerized plant as the dibble simultaneously forms a new hole in proper spaced relation to the covered hole.

BRIEF DESCRIPTION OF THE DRAWINGS

FIG. 1 is a perspective view of the present invention;

FIG. 2 is a cross-sectional view through the frame of FIG. 1;

FIG. 3 is an enlarged side view of the trowels and attachment to the lower end of the tube taken in the circle of FIG. 2;

FIG. 4 is a perspective view of the platform anchored to the frame for easy reach of the containerized plants with parts broken away; and FIG. 5 is an elevational view of a modified form of the invention.

DETAILED DESCRIPTION OF THE INVENTION

A simple, rectangular, tubular frame of plastic, preferably, polyvinyl chloride (PVC), having a pair of vertically spaced legs 10, 12 and a pair of horizontal legs 14, 16 connected together by T-fittings 18, 20 and 22 with an elbow fitting 24. Secured to the T-fitting 18 are a short tube 26 and a T-fitting 28. The T-fitting has a horizontal tube 30 connected thereto and capped at 32. The tube 30 is parallel to the tube 16 and thereabove. This latter forms the handle for the unit.

The lower end of tube 12 has a dibble 34 case of concrete having a large square end 36 and tapered to a point at 36 secured thereto. The larger or mouth end 36 is force fitted into the lower end of the T-fitting 22.

The lower end of the T-fitting 20 has secured thereto a pair of opposed trowels 40, 42 connected by a hose clamp 44. The trowels are each about 7.5 cm. long and each angles outwardly at about 45 degrees. Each trowel is constructed from 16 gauge steel.

In the preferred unit, the vertical tubes 10, 12 are 95 cm. and 81 cm., respectively. The horizontal tubes 14, 16 are 30 cm. long with the tubes being 3 cm. in diameter.

It is to be understood that the aforementioned sizes may be smaller or larger depending on the size of the container.

In use, a platform 46 may be secured to the tubes 10, 12 to support flats or containerized seedlings. This unit described above is preferably for containers up to 3 cm. in diameter.

In operation, a planter will make a hole with the dibble in a hill or loose soil. Then, while still in a standing position, he will shift the tube 10 sidewardly until it is directly over the first hole made by the dibble. Then he will drop a containerized seedling which he will take from a flat on the platform 46 on the tubes 10 and 12. It will then sit in the hole made by the dibble. Now, by pressing the handle downwardly, the opposed trowels will simultaneously cover the hole with the soil, and cause the dibble to make another hole spaced accurately apart from the first seedling and this process will continue. Thus the horticulturist is in standing position and by the use of the opposed trowels, completely fills the hole made by the dibble with the plant therein. No other prior device completely covers the hole.

The improvements being:

1. Hole forming and closing are performed simultaneously with a simple downward thrust of the device without the use of moving parts.

2. Exact plant to plant spacing is accommodated.

3. The hole closing device operates from both sides of the plant (not just one side as in other patents), thus assuring that the plant is established in a vertical position rather than on an angle.

4. A movable handle to accommodate the worker and allow easy storage.

5. Simple PVC materials which can easily be cut and extended or shortened with readily available plumbing fittings.

6. Vertical chute without obstructions which provides guidance to the seedling down to the level of the soil.

7. The size of the active components (chute, soil hole former and soil press trowels) of this device can be changed to accommodate any size seed, tuber, container bulb or seedling with or without an attached soil root block.

It should be apparent that the present invention will work well for large seeds such as corn and beans and small tubers and bulbs, as well as containerized seedlings.

The trowels 40 and 42 may have face-to-face cutouts as at 52, 54 in the medial portion of each trowel.

A modified construction is shown in FIG. 5 wherein a piece of polyvinyl chloride short tube 48 is partially cleft endwise at 50 and each portion is spread outwardly at about 45° as shown in FIG. 5. The upper end 48 is force fitted into the interior or the T-fitting 20 as shown in FIG. 5 or may be glued therein. It will accomplish the same results as the metal trowels.

To make it easier for the planter, a platform 46 is attached to the upper end of the unit so that a flat of containerized plants 56 may be fed to the hollow tubes 10 whereby they drop into the hole made by the dibble.

Although the dibble is mentioned herein as being made of concrete, any stiff material may be used such as steel or iron, plastic, etc. Also, it may be of any inverted conical shape.

Also, it is to be noted that the vertical tubes are spaced the correct distance to forestall transplanting.

It will be understood that details of the construction shown may be altered or omitted without departing from the spirit of the invention as defined by the following claims.

For example, it is envisioned that a mass product version of the device will consist of a molded plastic unit. This bypassing the requirement for expensive tee and elbow fittings.

We claim:

1. A combination planter and a hole maker for providing a hole, depositing a seedling and covering the soil around the seedling, comprising an elongated, tubular, rectangular frame having a pair of vertical tubes and a pair of horizontal tubes connected together to form said frame, a handle attached to same frame positioned above said frame, a dibble on the lower end of one of said vertical tubes and a pair of opposed trowels on the lower end of the other of said vertical tubes whereby the plant seedlings are inserted at the upper end of said other of said vertical tubes having the trowels thereon and by pressing downward on the handle, the trowels will completely cover the seedling.

2. The device according to claim 1 wherein the trowels are anchored at the end of the aforesaid vertical tube and project outwardly at a 45° angle and are made from steel plate.

3. The device according to claim 2 wherein a platform is anchored to the upper end of said vertical tube having the trowels thereon.

4. The device according to claim 2 wherein the trowels are anchored to the tube by a hose clamp.

5. The combination planter according to claim 1 said dibble is constructed of cast concrete having a square upper end, a tapered to a point at the opposed end, and being hollow.

6. A combination planter and a hole former in soil comprising a rectangular frame formed of polyvinyl chloride tubing having a pair of vertically opposed tubes and an upper and lower horizontal tube connected together by T-fittings of polyvinyl chloride and an elbow, one of the vertical tubes having a dibble on the lower end thereof, a short tube being cleft endwise at one end and spread apart to about 45° to the vertical, and the opposite end is secured to the lower end of the other of the vertical tubes to form a trowel in the fitting, and a handle is positioned above and connected to the upper horizontal tube and parallel therewith whereby the dibble will make a hole in the soil and the frame and handle move sidewardly whereby by downward pressure the dibble will space a second hole apart from the first hole and simultaneously the trowels will completely fill the hole in which the containerized seedling has theretofore been dropped through the tube containing the trowels.

* * * * *